United States Patent [19]
Gotch et al.

[11] Patent Number: 6,092,550
[45] Date of Patent: Jul. 25, 2000

[54] DIAPHRAGM VALVE SEAT ARRANGEMENT

[75] Inventors: James E. Gotch, Kirtland; Dale J. Kitchen, Euclid; Maria T. Longo, South Euclid; Victor N. Rasanow, Willoughby; Philip J. Smith, Madison, all of Ohio

[73] Assignee: Swagelok Marketing Co., Solon, Ohio

[21] Appl. No.: 09/015,751

[22] Filed: Jan. 30, 1998

Related U.S. Application Data

[60] Provisional application No. 60/037,698, Feb. 3, 1997, and provisional application No. 60/072,995, Jan. 29, 1998.

[51] Int. Cl.⁷ ....................................................... F16K 7/17
[52] U.S. Cl. ........................................... 137/365; 137/331
[58] Field of Search ..................................... 251/359, 363, 251/365, 360, 361, 331

[56] References Cited

U.S. PATENT DOCUMENTS

| | | |
|---|---|---|
| 954,172 | 4/1910 | Dalen . |
| 2,959,392 | 11/1960 | Platen et al. . |
| 3,430,539 | 3/1969 | Freeman . |
| 4,421,295 | 12/1983 | Parkison . |
| 4,644,847 | 2/1987 | Wolf . |
| 4,671,490 | 6/1987 | Kolenc et al. . |
| 4,684,106 | 8/1987 | Kolenc et al. . |
| 4,712,576 | 12/1987 | Ariizumi et al. . |
| 4,732,363 | 3/1988 | Kolenc et al. . |
| 4,750,709 | 6/1988 | Kolenc et al. . |
| 4,776,562 | 10/1988 | Kalaskie et al. . |
| 4,828,219 | 5/1989 | Ohmi et al. . |
| 4,840,347 | 6/1989 | Ariizumi et al. . |
| 4,903,939 | 2/1990 | Ariizumi et al. . |
| 4,905,575 | 3/1990 | Knecht et al. . |
| 4,934,652 | 6/1990 | Golden . |
| 4,953,826 | 9/1990 | Ohmi et al. . |
| 5,007,328 | 4/1991 | Otteman . |
| 5,108,069 | 4/1992 | Tada et al. . |
| 5,112,027 | 5/1992 | Hanyu et al. . |
| 5,131,627 | 7/1992 | Kolenc . |
| 5,186,434 | 2/1993 | Nishimura et al. . |
| 5,295,660 | 3/1994 | Honma . |
| 5,295,662 | 3/1994 | Yamaji et al. . |
| 5,326,078 | 7/1994 | Kimura . |
| 5,413,311 | 5/1995 | Arstein et al. . |
| 5,725,007 | 3/1998 | Stubbs . |
| 5,743,513 | 4/1998 | Yoshikawa et al. . |

FOREIGN PATENT DOCUMENTS

| | | |
|---|---|---|
| 0 053 947 A1 | 3/1993 | European Pat. Off. . |
| 1.358.512 | 3/1964 | France . |
| 64-3387 | 1/1989 | Japan . |
| 64-26071 | 1/1989 | Japan . |
| 64-26073 | 9/1989 | Japan . |
| 2-271168 | 11/1990 | Japan . |
| 405026357 | 2/1993 | Japan . |
| 405-215251 | 8/1993 | Japan . |
| 405288280 | 11/1993 | Japan . |
| 199672 | 7/1923 | United Kingdom . |
| 875446 | 8/1961 | United Kingdom . |
| 1015412 | 12/1965 | United Kingdom . |

*Primary Examiner*—Kevin Lee
*Attorney, Agent, or Firm*—Calfee Halter Griswold

[57] ABSTRACT

A flow control device includes a first body and a second body; a threaded engagement for clamping the bodies together in an axially aligned relationship; a diaphragm seal that is disposed axially between the first and second bodies to form a seal there between; each of the first and second bodies having a generally flat surface portion near its respective outer periphery; at least one of the generally flat surfaces being adjacent an outer corner thereof; the diaphragm being singularly clamped between the generally flat portions; the diaphragm having an outer peripheral portion adjacent the generally flat surfaces and that bends over and seals at the corner.

11 Claims, 8 Drawing Sheets

DIAPHRAGM VALVE SEAT ARRANGEMENT

RELATED APPLICATIONS

This application claims the benefit of U.S. provisional application Nos. 60/037,698 filed on Feb. 3, 1997 and 60/072,995 filed on Jan. 29, 1998 for DIAPHRAGM VALVE (Docket No. 22188-04019 with Express Mail Label No. EM178207495US), the entire disclosures of which are fully incorporated herein by reference.

TECHNICAL FIELD OF THE INVENTION

The subject invention is directed to a high flow diaphragm valve of the general type shown in U.S. Pat. Nos. 4,671,490; 4,732,363; and, 4,750,709. More particularly, the invention is directed to a diaphragm valve having an improved valve seat arrangement and an improved body seal using a single clamp and corner arrangement.

BACKGROUND OF THE INVENTION

Diaphragm valves are generally known and include a body seal arrangement and a valve seat arrangement. The body seal typically is achieved at or near the outer peripheral area of the diaphragm by clamping and compressing the diaphragm between facing surfaces of the valve body. Imperfections in the body surfaces and diaphragm surface, however, can require very high compression of the diaphragm to achieve a satisfactory seal. Harder materials for the diaphragm exacerbate the body seal problem at the clamping surfaces.

A valve seat is used to seal off an inlet and outlet passageway by engaging with the diaphragm. Prior designs tend to have large surface areas of the seat exposed to the fluid, thus providing possible leak paths and contamination. Valve seat surfaces can be pre-formed with specific contours to improve sealing, but such steps tend to be time consuming and thus more expensive.

Accordingly, it is a general objective of the present invention to provide a diaphragm-type valve that has improved body seal and valve seat arrangements and that can be manufactured at competitive costs and performance, with higher flow rates achieved using similar overall device dimensions.

SUMMARY OF THE INVENTION

In accordance with one embodiment of the invention, a flow control device such as a diaphragm valve includes a first body and a second body; means for clamping the bodies together in an axially aligned relationship; a diaphragm seal that is disposed axially between the first and second bodies to form a seal there between; each of the first and second bodies having a generally flat surface portion near its respective outer periphery; at least one of the generally flat surfaces being adjacent an outer corner thereof; the diaphragm being singularly clamped between the generally flat portions; the diaphragm having an outer peripheral portion adjacent the generally flat surfaces and that bends over and seals at the corner.

In accordance with another aspect of the invention, a valve seat arrangement is provided for a diaphragm valve of the type having a first body with fluid inlet and outlet openings therein and a second body axially coupled to said first body with a contoured diaphragm seal clamped there between for controlling flow between said inlet and outlet passages, the valve seat arrangement including a first collar that surrounds one of said fluid openings and that extends axially toward the diaphragm; a second collar that is radially spaced outward from the first collar to form a recess there between; the second collar extending axially toward the diaphragm a distance greater than the first collar; a valve seat disposed in the recess; the seat extending axially beyond the second collar and being retained in the recess by the first collar; the seat having an upper surface that engages with and forms a seal with a portion of the diaphragm to close the one opening; the upper surface generally conforming to the diaphragm contour when engaged therewith.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

The valves of the subject application can best be understood by reference to the accompanying drawings wherein.

DETAILED DESCRIPTION OF THE INVENTION

Figure 4A:
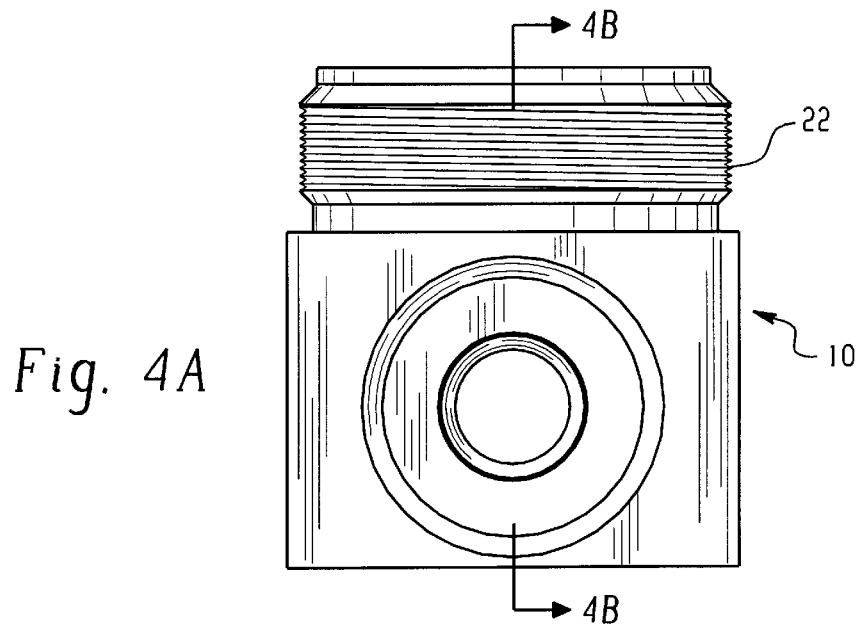
FIG. 4A is an elevational view of the body element used in all versions of the subject valve.
Figure 4B:
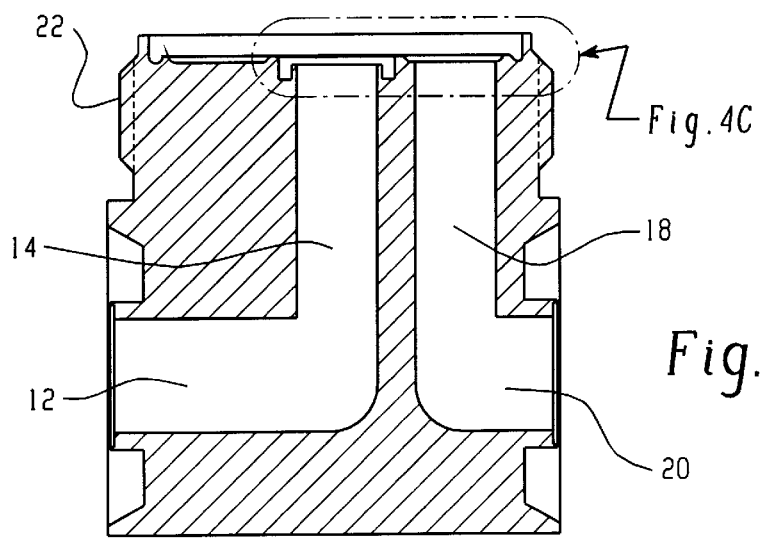
FIG. 4B is a view taken on line 4B—4B of FIG. 4A.
Figure 4C:
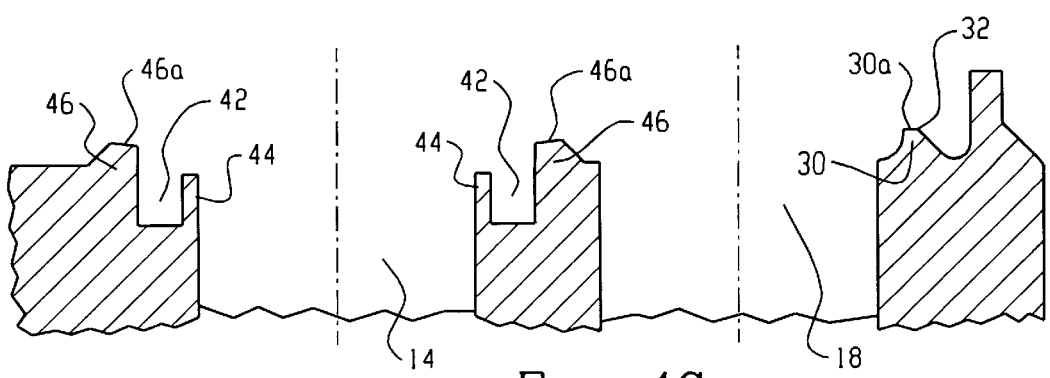
FIG. 4C is a greatly enlarged view of the circled area of FIG. 4B.

As mentioned herein earlier, the valves of the subject invention all use a common body design and construction which can best be understood by reference to FIGS. 1, 4A, 4B, 4C, 5A, 5B, 6A, 6B, and 6C. As illustrated therein, the body 10 is machined from a suitable metal such as stainless steel and comprises an inlet passage 12 which connects with a vertically extending flow passage 14 leading to a valved outlet opening 16 at the upper end of body 10. An exit or discharge passage 18 extends downwardly parallel to the passage 14 and connects an outlet 20. The upper end of the body 10 is circumferentially threaded at 22 for threaded receipt of a bonnet nut member 24. Positioned over the upper end of the body 10 and clamped thereto by a bonnet member 26 is a multiple layer metal diaphragm 28. The general construction and arrangement of the diaphragm 28 can be, for example, as described in the above-mentioned U.S. patents which are incorporated herein by reference. Of importance to the subject invention is the manner in which the peripheral edge of the diaphragm assembly 28 are clamped and sealed relative to the body 10. In this regard, attention is directed to FIGS. 4A–4C, 5A, and 5B. As shown in FIG. 4C, a raised flange 30 extends circumferentially about the upper end of the body 10 and encircles both the outlet from passage 14 and the inlet to passage 18. The outer wall of the collar 30 is preferably inclined as shown so that the included outer corner angle 32 is in the range of about 120° to 145°; this range is exemplary, however, with the included angle being selected at any suitable value based on the overall apparatus design and configuration.

Figure 5A:
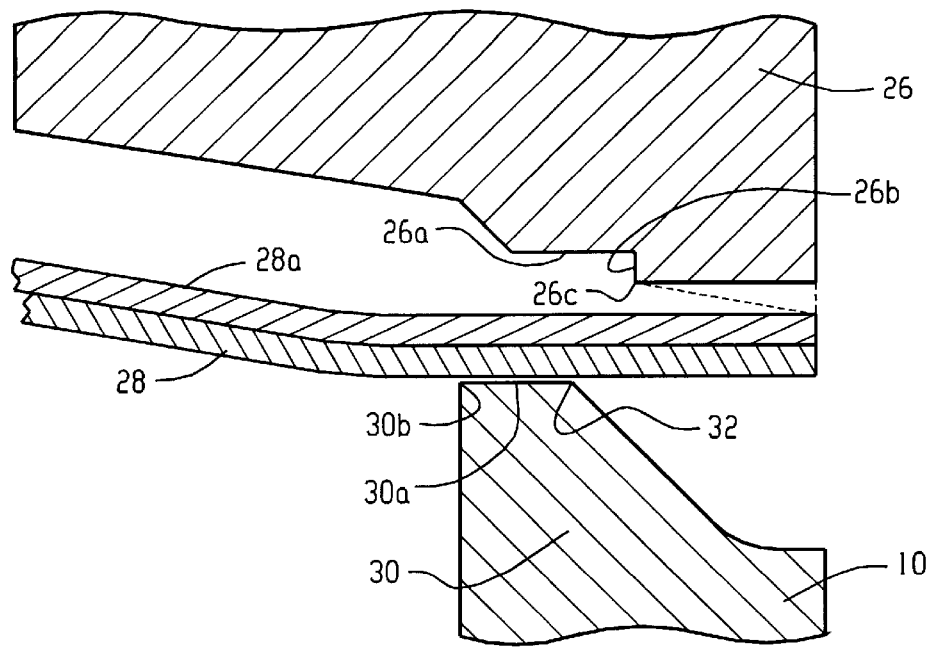
FIGS. 5A and 5B are views showing the circled area of FIG. 1 immediately before the bonnet is clamped into engagement with the diaphragm and immediately after completion of the clamping.
Figure 5B:
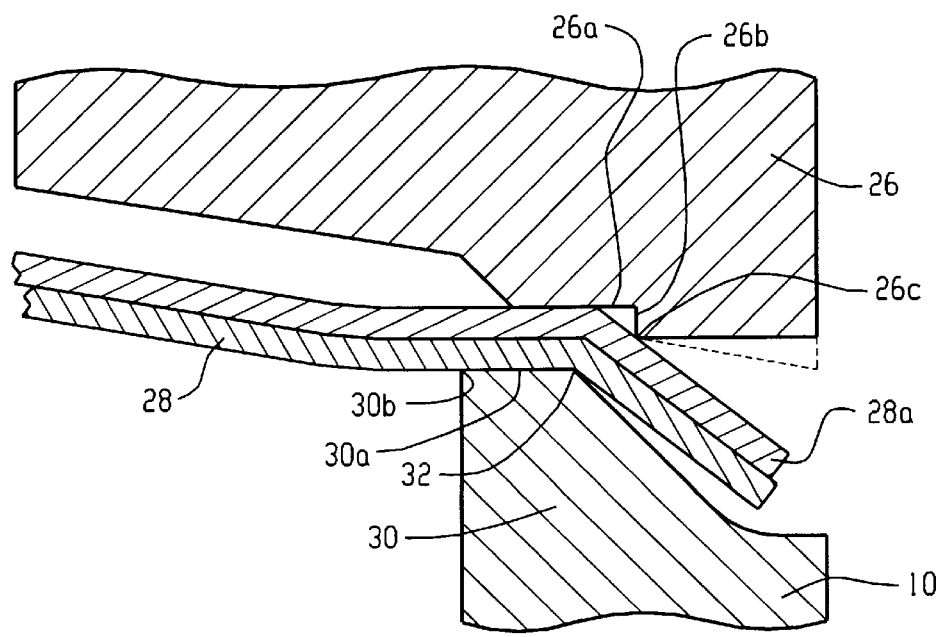

FIGS. 5A and 5B are greatly enlarged showings of the relationship between the flange or collar 30, the diaphragm assembly 28, and the lower clamping edge portion of the bonnet 26. The diaphragm 28 is shown in position on the top planar surface 30a of the collar 30. Preferably, the diaphragm is provided with a convex center section (see FIG. 1) and a generally planar, radially extending peripheral edge section 28a as illustrated in FIG. 5A. The bonnet 26 itself has a contoured lower peripheral surface which includes a flat 26a that is surrounded by a cylindrical wall 26b that terminates in a corner 26c. When the bonnet is driven into clamping engagement as shown in FIG. 5B, the flat 26a clamps the top surface of the diaphragm assembly 28 as shown. The corner 26c, however, deflects and bends the outer peripheral portion of the diaphragm downwardly creating a high sealing pressure over corner 32 of collar 30. The final relationship is shown in FIG. 5B.

The clamping sequence is as follows. When the bonnet is driven into initial clamping engagement as in FIG. 5A, the corner 26c deflects and bends the outer peripheral portion 28a of the diaphragm downward and over the corner 32 of the collar 30 (see FIG. 5A). The flat 26a then begins clamping the top surface of the diaphragm 28 against the top planar surface 30a of the collar 30 ((preferably but not necessarily the flat 26a is generally parallel to the flat 30a when the bonnet and body are clamped together), while the corner 26c continues acting on the diaphragm peripheral portion 28a thus bending and crimping the diaphragm 28 around the corner 32. The force applied during this make-up procedure is sufficient to deform or yield the diaphragm 28 and the corner 32 to create a primary body seal there between. The deformation or yielding of the corner 32 and the diaphragm to form the primary seal is controlled by proper sizing of the corner 26c diameter and hardness, the corner 32 diameter, the length of the cylindrical wall 26b and the diaphragm 28 thickness. It is preferred but again not required that the deformation or yielding occur primarily at the corner 32 and the diaphragm in order to produce a good primary seal; therefore the bonnet 26 can be made of a harder material than the collar 30. A suitable material is 17-4PH (precipitation hardened) stainless steel although this is but one example of stainless steel and other materials that are well known to those skilled in the art. The primary seal corner 32 deformation is limited when the diaphragm 28 is clamped between the flat planar surfaces 26a and 30a, which clamping produces a secondary seal between the bottom surface of the diaphragm 28 and the top planar surface 30a of the collar 30. This secondary seal and clamping helps reduce or eliminate entrapment areas. The radial inner edge 30b of the collar 30, and the clamping force applied to the diaphragm 28 radially inward from the corner 32 primary seal area also operate to reduce stress applied to the primary seal under cyclic operation of the diaphragm 28 by acting as pivot points for the diaphragm 28 as the diaphragm cycles up and down. These pivot points are radially spaced inward of the primary seal and thereby reduce stresses applied to the primary seal area during such diaphragm movement. The described body seal design significantly reduces the interior space required to sealingly clamp the diaphragm 28 within the valve, thus freeing more internal space to increase fluid flow. Still further, during the initial engagement when the corner 26c engages the diaphragm flat outer peripheral portion 28a, the diaphragm 28 is placed in tension prior to being clamped between the flats 26a, 30a. This tension increases the radius of the diaphragm dome and the transition radius to the peripheral flat portion 28a. The tension thus reduces the cyclic stress caused by "snap-through" action of the diaphragm. Both of these effects improve fatigue life of the diaphragm 28.

The portion of the bonnet 26 radially outward of corner 26c can vary as shown by the dotted line. Additionally, the included angle of the corner 26c can vary from less than 90° to somewhat in excess of 100° or more. The angle should be selected, however, so as to control the necessary deflection of the diaphragm over the corner 32 and assure a sealing contact as required.

Figure 1:
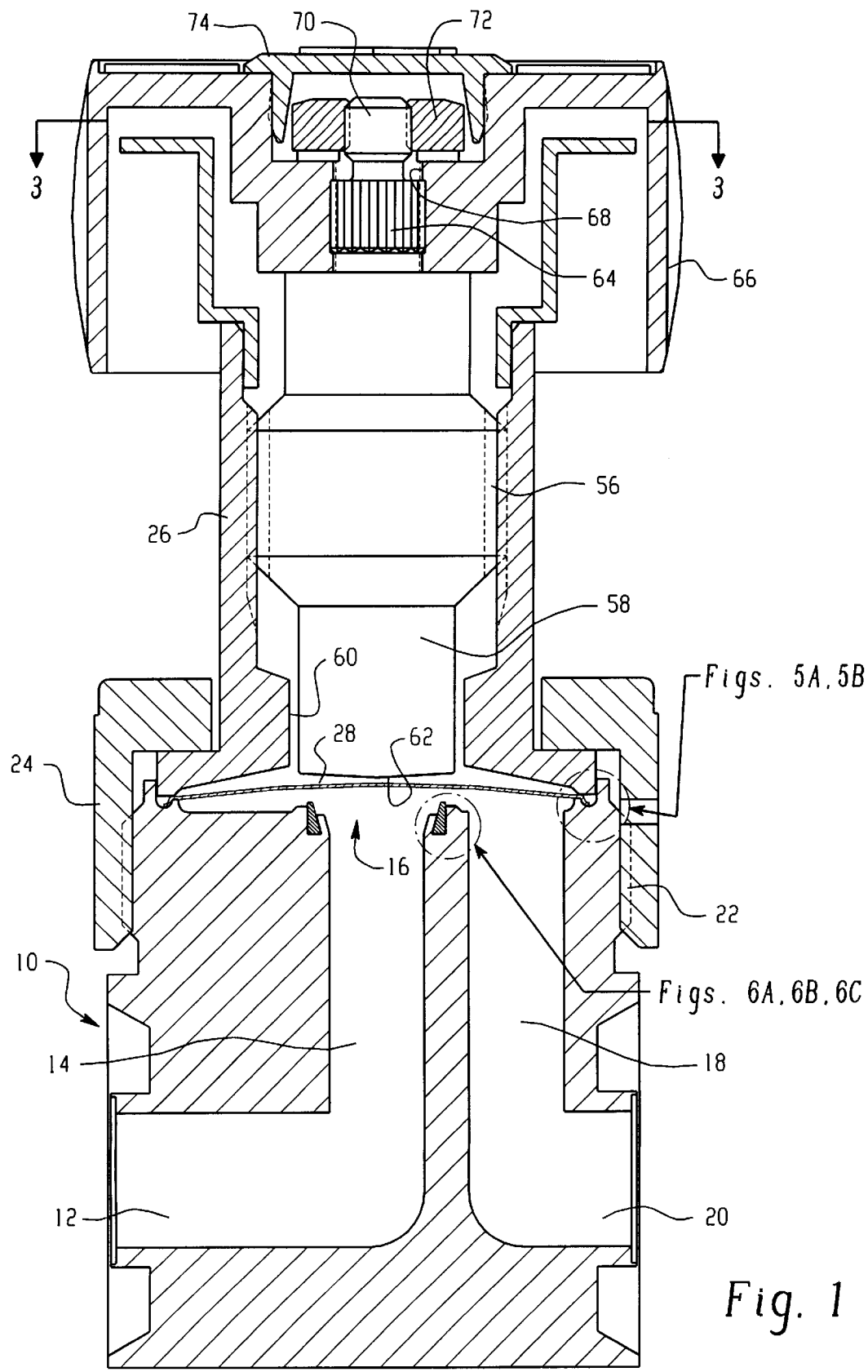
FIG. 1 is a vertical cross-sectional view through a hand operated version of the diaphragm valve.

Referring again to FIG. 1, it will be seen that the clamping forces necessary to drive the peripheral edge of the bonnet into sealing engagement with the diaphragm assembly 28 and produce the necessary sealing and clamping about the peripheral edge of the diaphragm is generated by the bonnet nut 24 being threadedly engaged with the body and suitably driven downwardly. As previously mentioned, the diaphragm 28 preferably has a preformed convex shape as illustrated in FIG. 1 so that in its normal, non-deflected position, it extends above the outlet 16 from passage 14.

Figure 6A:
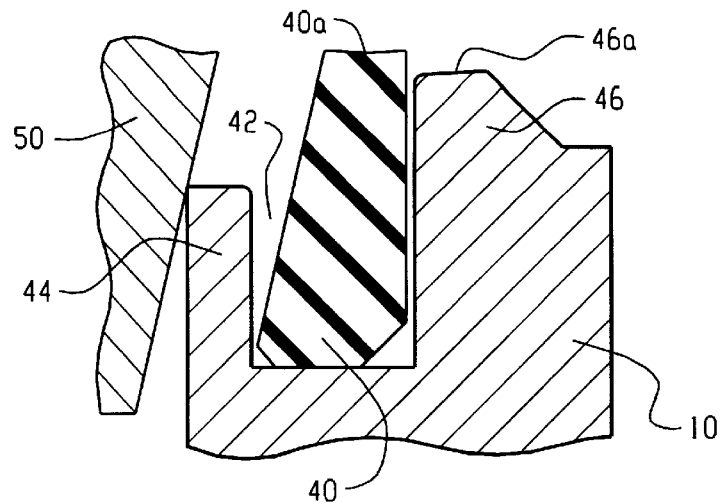
FIGS. 6A, 6B, and 6C show the circled seat area of FIG. 1 during the sequence of forming and staking the resilient seat element into position in the body.
Figure 6B:
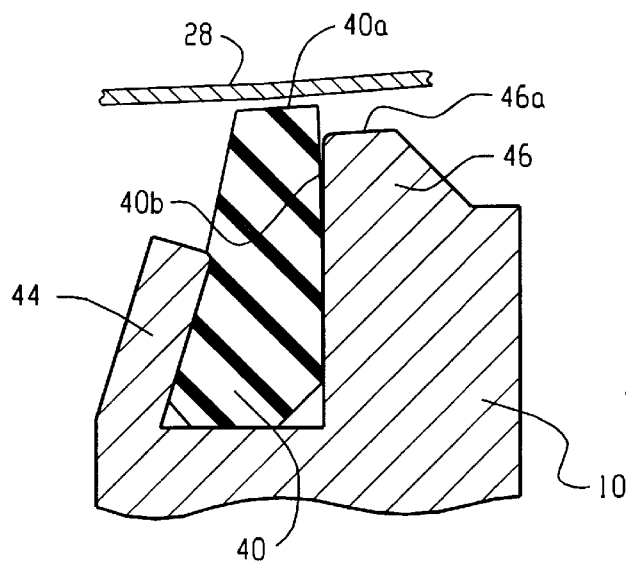
Figure 6C:
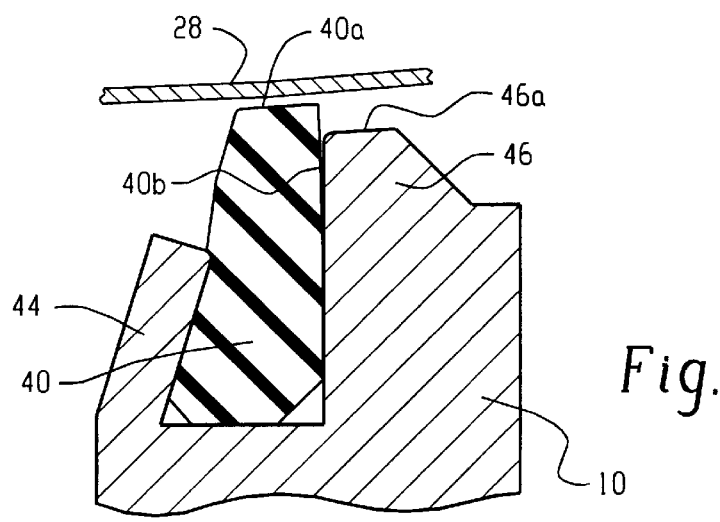

FIGS. 6A–6C illustrate the seat and the manner it relates to the diaphragm assembly 28. In the subject embodiment, the seat is defined by a resilient seat ring member 40 that is positioned in a recess 42 formed circumferentially about the upper end of the passage 14. Referring to FIG. 4C, this recess 42 is formed to extend axially in from the top surface of body 10 and provide an axially extending flange or collar 44. Radially outward of the recess 42 is a raised collar 46 having the contour and general configuration shown. Referring again more particularly to FIGS. 6A–6C, the resilient seat ring 40 has the normal non-deformed configuration shown in FIG. 6A and is formed from any suitable resilient material such as PCTFE (polychlorotrifluoroethylene) or any of the materials suggested in the above-identified U.S. patents depending upon the operating environment and conditions.

The assembly of the seat into the recess 42 is carried out in the sequence suggested by FIGS. 6A–6C. FIG. 6A shows the seat element positioned in the recess 42 subsequent to deformation of the inner collar or flange 44. With the seat element 40 positioned in the recess, a staking tool is brought into position as generally illustrated by item 50. The staking tool item 50 is then driven downwardly to deflect radially outward the collar or flange 44 to a position as shown in FIG. 6B wherein the seat element is mechanically locked, tightly gripped and sealed between the collar 44 and the surrounding body sections including the collar 46. This staking process causes the upper surface 40a of the seat 40 to become slightly concave to more closely match or conform with the contour of the diaphragm 28 lower surface (as viewed in FIG. 6B) during shutoff. When the body and the seat assembly are subsequently assembled into position in an operative valve, the diaphragms can be deflected downwardly during the first cycle and they generally follow the contour of the lower end of the operating stem and/or operating button in a manner subsequently to be described. That is, the generally convex configuration of the diaphragm assembly becomes concave and engages in sealing fashion with the upper concave end surface 40a of the seat ring 40. The diaphragm 40 further engages the upper surface 46a to reduce diaphragm and seat damage due to over-torque or excessive force during shutoff. Over repeated cycling the seat upper surface 40a will tend to further conform to the diaphragm contour.

The outer perimeter 40b of the seat 40 is nearly entirely supported by the collar 46 to reduce or limit seat strain during high shut-off forces. Also, the radially inner collar 44 is substantially shorter in its axial length than the axial length of the outer collar 46. For example, the inner collar 44 axial length may be between about 25% and about 75% of the axial length of the outer collar 46. This arrangement provides space for the upper portion of the seat 40 to deform (such as, for example, in the nature of a bulge as represented in FIG. 6c) inward during shut-off and to increase resiliency of the upper portion of the seat 40 to elastically deform under shut-off forces typically incurred in the various embodiments herein, thus permitting the upper surface 40a of the seat 40 to conform to and seal against the diaphragm 28.

The above-described seat 40 configuration and assembly staking process allow a more economical finishing of the seat 40 sealing surface 40a. The seat seal surface 40a can be initially formed as a flat horizontal surface to simplify the finishing step thereof. If the seat surface 40a were formed concave, it would be significantly more costly to finish the surface. The concave contour of the seat surface 40a that is produced by the staking operation also increases the contact surface area between the seat 40 and the diaphragm. This increased sealing area including the increased radial distance of the contact area improves seat seal performance and reduces permeation leakage across the sealing area.

Figure 2:
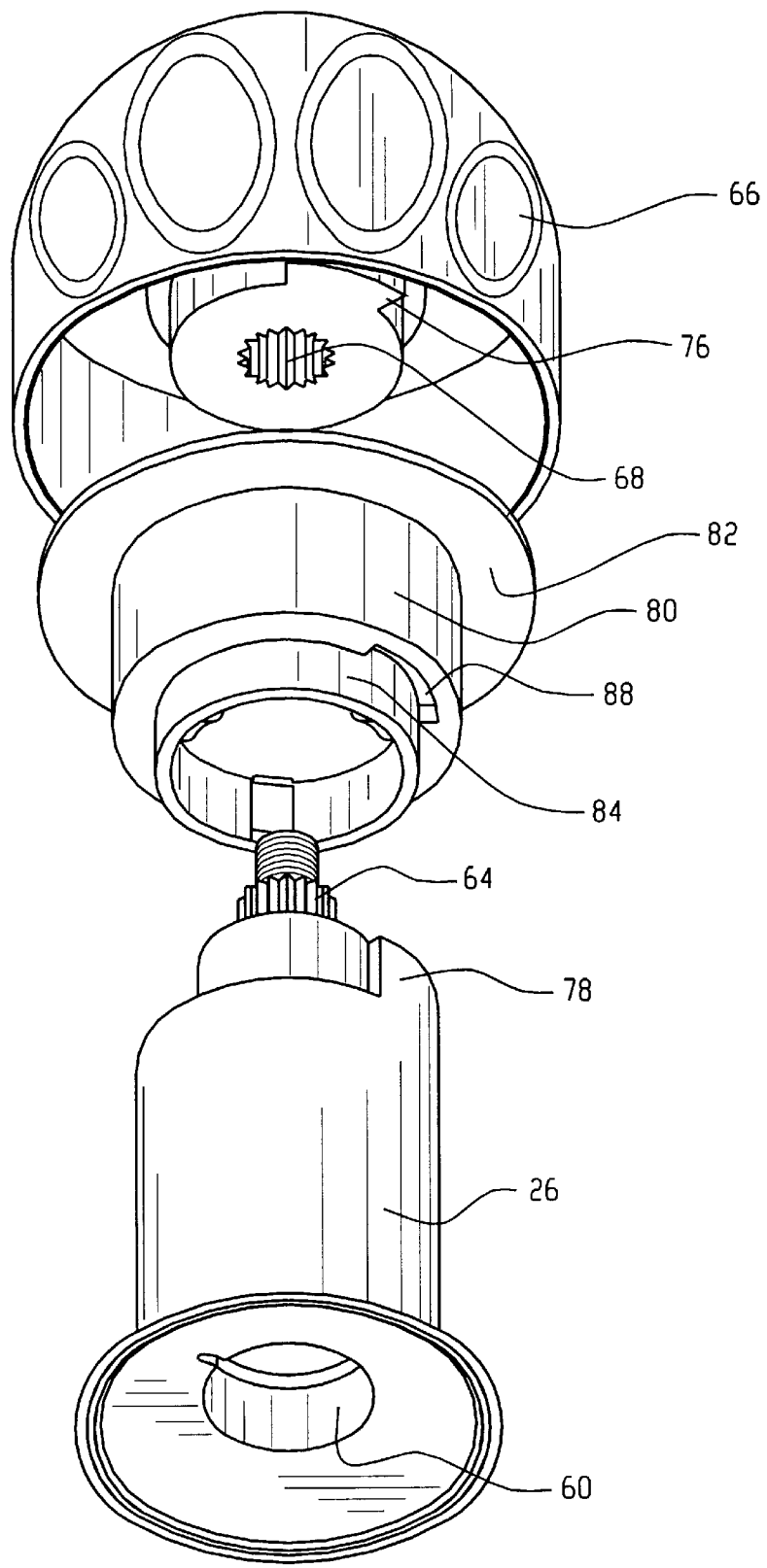
FIG. 2 is an exploded isometric view of the operating portion of the valve of FIG. 1.
Figure 3:
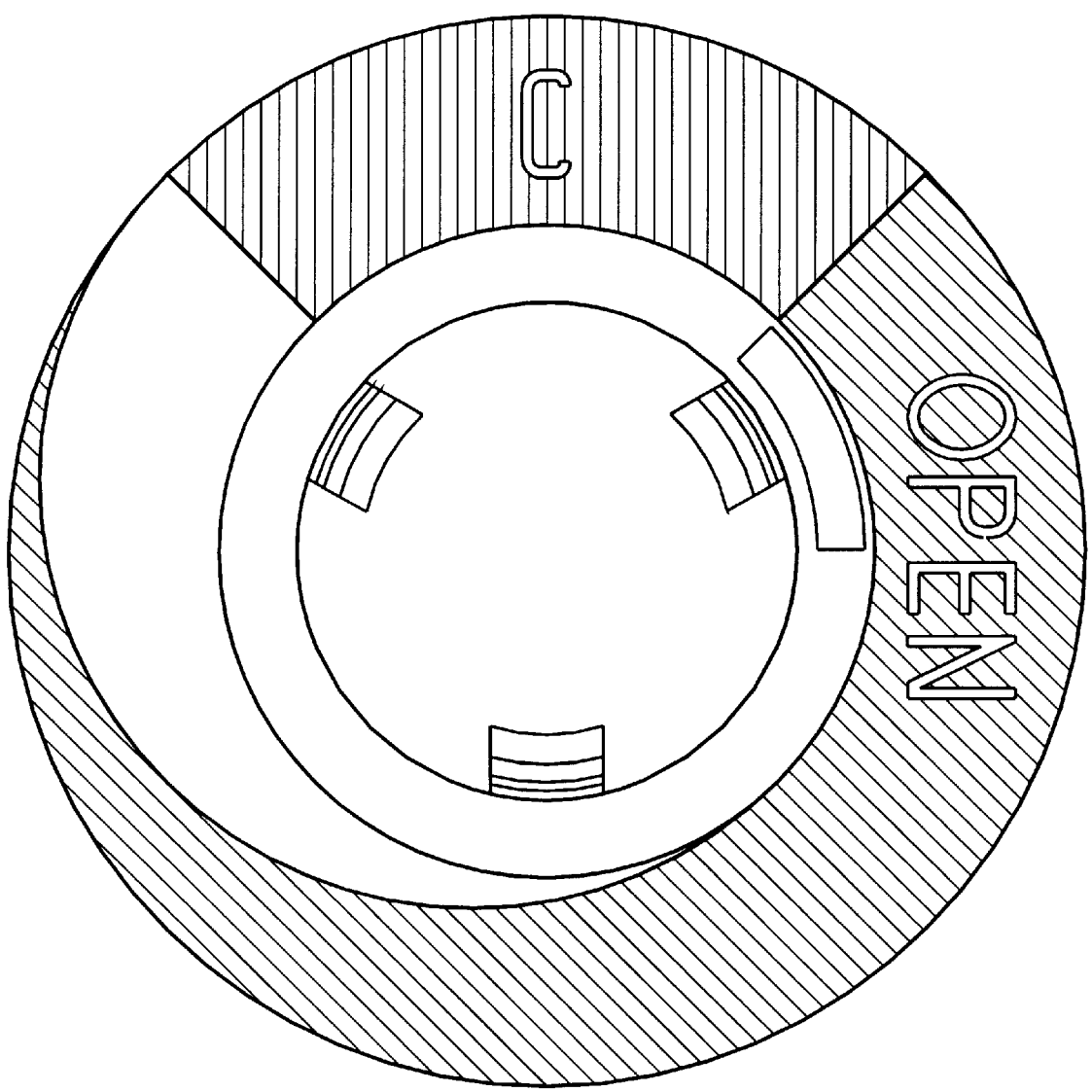
FIG. 3 is a partial section view taken on line 3—3 of FIG. 1 but showing the indicator dial used with the manual operating system of FIG. 2.
Figure 7:
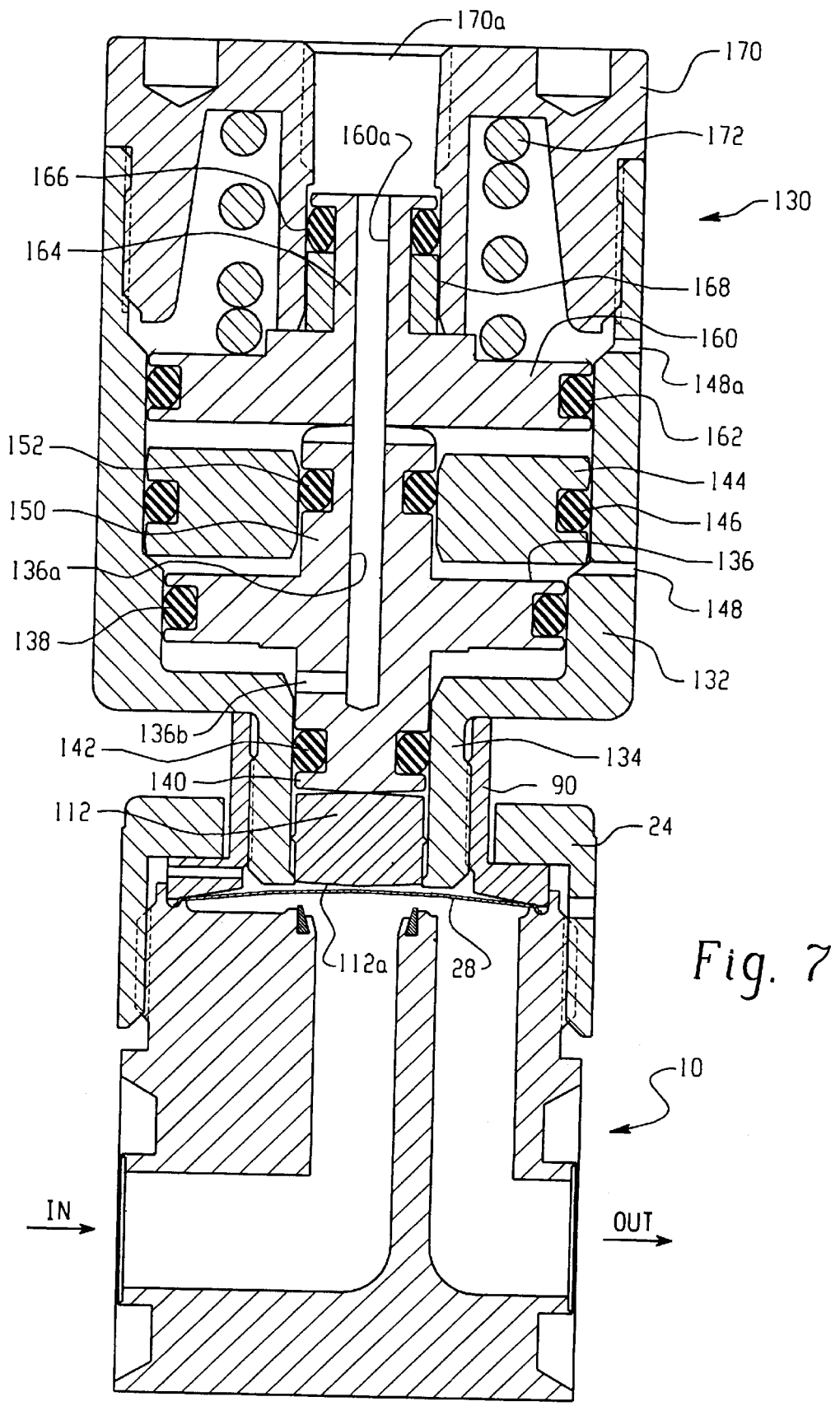
FIG. 7 is a vertical cross section through an air-actuated version of the valve (this version is a normally closed air actuator)
Figure 8:
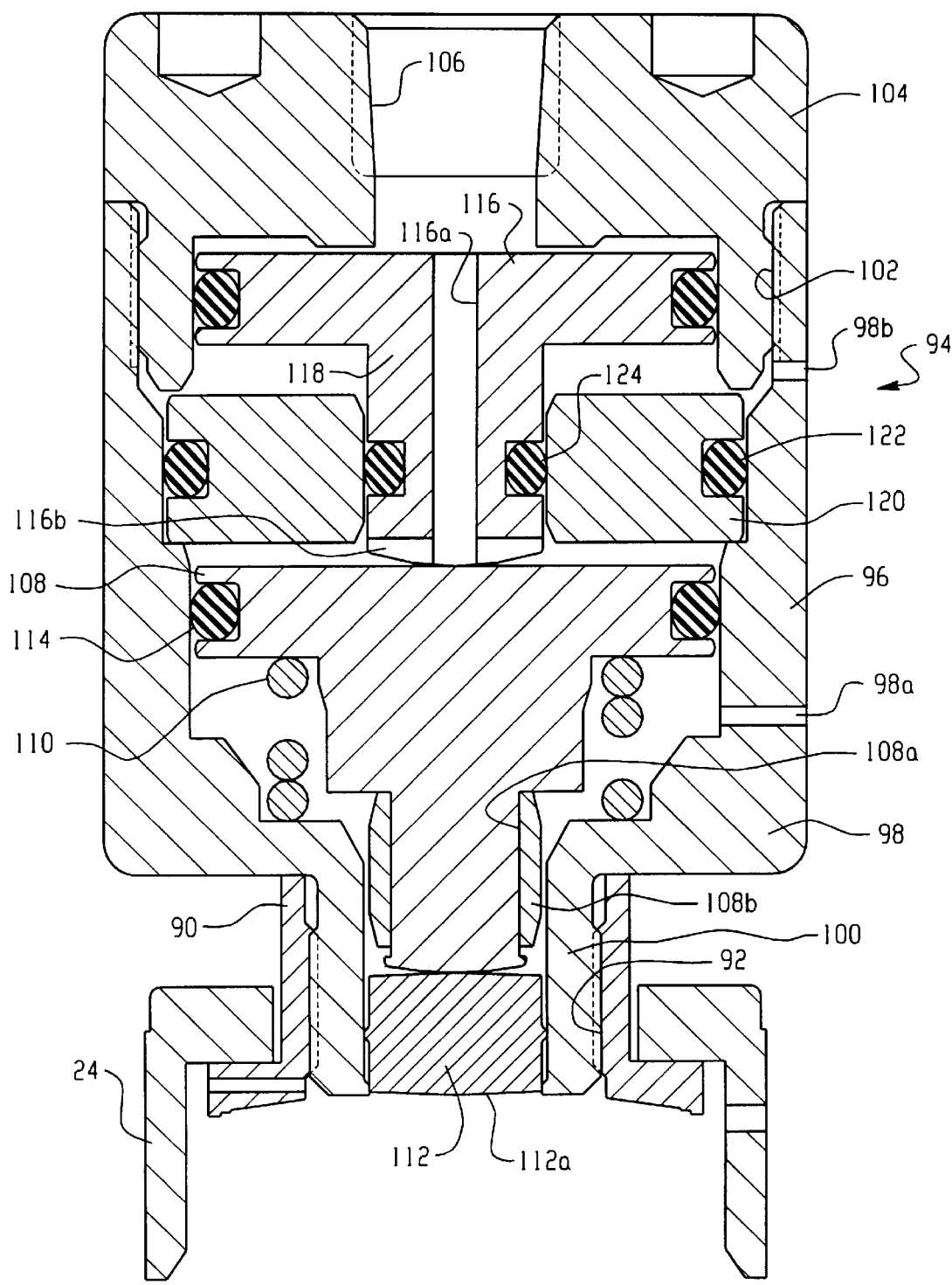
FIG. 8 is a vertical cross-sectional view through a normally open air actuator which can be used on the valve body of FIG. 1 or FIG. 7.

The basic structure thus far described is used with a hand operator as well as a normally closed and a normally opened manual operator or air actuator. Specifically, FIGS. 1, 2, and 3 illustrates the manual operator whereas FIGS. 7 and 8 illustrate the two forms of air actuators or operators. Referring in particular to FIGS. 1–3, the bonnet 26 of the hand or manual operator is provided with internal threads which receive an externally threaded operator element 56 having a cylindrical lower end 58 that passes through a reduced diameter opening 60 at the lower end of the bonnet 26. The lower end of the operator is slightly convex as shown at 62 and directly engages the top surface of the diaphragm assembly 28. The lower surface of the operator 62 closely matches the upper surface 46a of the outer collar 46 and biases the seat 40 sealing forces in a radial outward direction where the seat 40 is supported by the raised outer collar 46. Preferably, a suitable lubricant, either solid or liquid, is positioned between the upper surface of the diaphragm assembly 28 and the operating convex surface 62 of the operator 58.

At its upper end, the operating element 56 is provided with a reduced diameter keyed end portion 64 that receives the manual operating handle 66. It will be noted that the handle 66 includes a central opening 68 that is also keyed to correspond to the end portion 64 of operating member 56. The outermost end of the operating element is threaded as shown at 70 and adapted to receive a clamp nut 72 that holds the handle 66 in position. A suitable end cover 74 is snapped in position in the handle to cover nut 72.

Movement of the handle is limited to a three-quarter turn arrangement between full open and full closed. This is accomplished by a stop element 76 molded within the handle and arranged to engage opposite sides of a rigid stop element 78 extending upwardly from the top end of bonnet 26. Movement of the handle is, of course, limited by engagement between the stop 76 and element 78 at opposite ends of rotation.

Located between the bonnet 26 and the handle 66 is a base element 80 which includes a central cylindrical portion and an upper radially extending flange 82. At its lower end, there is a reduced diameter sleeve portion 84 which extends downwardly within the upper end of bonnet 26 as best seen in FIG. 1. A suitable opening 88 is formed through the base member 80 to allow the stop 78 to extend upwardly therethrough for engagement by stop member 76 of the handle 66.

The top surface of the flange 82 of the base 80 is provided with indicia of the type shown in FIG. 3. Similarly, the handle is provided with an opening through its upper surface so that the indicia on flange 82 is visible therethrough. Preferably, the opening through the handle is a 90° slot which generally corresponds to the portion indicated with the letter C in the indicia markings. Thus, when the handle is in the full closed position, the red C area of the indicia shows through the opening indicating to an observer that the valve is in a closed position. However, as the valve handle is moved counterclockwise, the indicia is shown to change from a white/green combination to a full green open position.

In addition to the manual operated arrangement, it is possible to operate the valve with other types of actuators such as the normally open actuator shown in FIG. 8. This actuator is arranged so as to thread directly to the upper end of the body 10 and includes a bonnet nut 24' which clamps a shorter and modified bonnet element 90 into position to clamp the diaphragm in sealing engagement with the body 10. The interior of the bonnet 90 is threaded as shown at 92. The air actuator 94 has a housing 96 including a lower housing portion 98 that has a reduced diameter threaded end 100 which is threaded into the bonnet nut 90 as shown. The housing portion 98 defines a multiple diameter internal chamber which is threaded at its upper end as shown at 102 and receives a cap 104. The cap 104 is provided with a threaded inlet port 106 for connection to a suitable air supply line (not shown). Positioned within the chambers defined by housing component 98 is a first piston member 108 which is mounted for vertical reciprocation and is continually biased in an upward valve open direction by a relatively heavy coil spring 110. The lower end or reduced diameter portion 108a of piston 108 receives a wear resistant bushing 108b to guide the lower piston 108 within the reduced diameter housing portion 100. The lower end of the piston 108 bears against a drive button member 112 that is guided and retained within the portion 100 and acts directly against a top surface of the diaphragm 28 of the associated valve body. Preferably, the button 112 is formed from a suitable plastic material having lubricating qualities. The lower end surface 112a of the button 112 is slightly convex to closely match the top concave surface 40a of the seat 40. The piston 108 is sealed by a suitable O-ring 114 located about its upper end. Normally, the piston is biased upwardly as shown to a valve opening position. The area below the piston 108 is vented to atmosphere through an opening 98a. A second piston member is carried above the first piston 108. The second piston 116 has a reduced diameter portion 118 that extends through an intermediate wall defining piston-like member 120 located generally centrally of the housing 94. The intermediate wall 120 is sealed by an O-ring 122 and the reduced diameter portion 118 is also sealed by an O-ring 124 where it passes through the wall 120. The area between the upper piston 116 and the intermediate piston 120 is vented to atmosphere through an opening 98b.

Air supplied through inlet port 106 acts against the top surface of the piston 116 and is also conducted through the center opening 116a and the radial grooves 116b so as to fill the space between the lower surface of the wall 120 and the top surface of piston 108. Thus, this allows the downward force of both the area of the top piston 116 and the top of piston 108 to act against the force of spring 110 and move the valve to a closed position. Thus, the two piston arrangement provides a great force multiplication.

In addition to the normally open air actuator as shown in FIG. 8, a normally closed air actuator is also proposed and illustrated in FIG. 7. The FIG. 7 showing shows the assembly directly connected to the valve body 10. The normally closed actuator assembly 130 is connected to the valve body 10 by the previously-mentioned bonnet nut 24' and the bonnet 90. Here, again, a button element 112 with a lower surface 120 slightly convex to closely match the top concave surface 40a of the seat 40, is used to act directly against the diaphragm assembly 28. The actuator assembly 130 includes a main housing member 132 having a lower end 134 of reduced diameter and threadedly received in the bonnet 90. The housing 132 has a stepped diameter interior as shown and carries a first piston member 136 at its lower end. The piston 136 is mounted for vertical reciprocation and is sealed by a central O-ring 138. At its lower end, reduced diameter portion 140, it is also provided with an O-ring 142 and is sealed within the reduced diameter opening within the end portion 134. Centrally of the housing member 132 there is a wall defining disk-like member 144 which is sealed about its outer periphery by an O-ring 146. The area under the wall 144 is vented to atmosphere through an opening 148. The reduced diameter upper end portion 150 of the piston 136 is sealingly and sliding received through the central opening in the wall member 144 and sealed during movement therethrough by an O-ring 152.

Positioned above the wall 144 for acting against the upper end of piston portion 150 is a second actuating piston 160 which is mounted for vertical reciprocation in the upper end of the housing member 132 and sealed about its periphery by an O-ring 162. The reduced diameter upper end portion 164 of the upper piston 160 is provided with an O-ring 166 and is slidably received within a cylindrical bore 168 carried in an end cap member 170. The area above the upper piston 160 is vented to atmosphere through an opening 148a. The end cap member is threadedly and sealing received on the upper end of the housing member 132 and carries a relatively heavy coil spring 172 which acts downwardly against the piston 160 which in turn acts against the upper end 150 of piston 136. Thus, the valve is normally biased to a closed position. The showing of FIG. 7 shows the valve in its open position however. To achieve this open position, air is supplied through the port 170a at the upper end of cap 170. It then flows through the central opening 160a to a position under the piston 160 where it exerts an upper force tending to act against the bias of spring 172. Additionally, air is supplied through the central opening 136a to a position where it flows radially through a passage 136b to the space under piston 136. This biases piston 136 upwardly with the upper end portion 150 bearing against the underside of piston 160. This produces a multiplication of force acting in an upward direction allowing the diaphragm assembly 28 to move to the open position shown.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A valve diaphragm seat arrangement for a diaphragm valve of the type having a first body with fluid inlet and outlet openings therein and a diaphragm for controlling flow between said inlet and outlet passages, the valve diaphragm seat arrangement comprising: a first collar that surrounds one of said fluid openings and that extends axially toward said diaphragm; a second collar that is radially spaced outward from said first collar to form a recess there between; said second collar extending axially toward said diaphragm a distance substantially greater than said first collar; a valve seat partially disposed in said recess; said seat extending axially beyond said second collar and being retained in said recess by said first collar; said seat having an upper surface that engages with and forms a seal with a portion of said diaphragm to close said one opening.

2. The apparatus of claim 1 wherein said said upper surface generally conforms to said diaphragm contour when engaged therewith.

3. The apparatus of claim 1 wherein said first collar has an axial length that is less than about three-fourths the axial length of said second collar.

4. The apparatus of claim 1 wherein said first collar is staked radially outward to crimp a lower portion of said seat; said crimp displacing seat material to form a contour to said seat upper surface.

5. The apparatus of claim 4 wherein said contour is a concave surface that conforms to said diaphragm portion when engaged therewith.

6. The apparatus of claim 4 wherein said seat is initially formed with a flat upper surface that lies substantially transverse its longitudinal axis; said surface being deformed into a concave shape when said seat is retained in said recess by said first collar.

7. The apparatus of claim 1 wherein said second collar has an axial length that is substantially greater than said first collar axial length; said second collar having an upper surface that is generally contoured to said seat upper surface when engaged with said diaphragm.

8. The apparatus of claim 7 wherein said seat upper surface extends axially slightly beyond said second collar upper surface; said second collar including an interior wall that supports said seat when said diaphragm is sealingly engaged therewith.

9. The apparatus of claim 8 wherein said second collar upper surface engages said diaphragm to reduce damage due to over-torque or excessive force.

10. The apparatus of claim 1 wherein said seat upper surface is a generally flat concave surface to provide a substantial radially extending surface area to seal said diaphragm.

11. The apparatus of claim 10 wherein said seat upper surface extends axially slightly beyond said second collar.

* * * * *